United States Patent [19]

Kato et al.

[11] Patent Number: 5,174,170
[45] Date of Patent: Dec. 29, 1992

[54] DEVICE FOR CONTROLLING THE POSITION AND MOVEMENT OF A CABLE

[75] Inventors: Noboru Kato; Atsushi Sakakibata, both of Aichi; Hiroyuki Takahashi, Hiroshima, all of Japan

[73] Assignees: Nissinbo Industries Incorporated, Tokyo; Mazda Motor Corporation, Hiroshima, both of Japan

[21] Appl. No.: 817,546

[22] Filed: Jan. 7, 1992

Related U.S. Application Data

[63] Continuation of Ser. No. 532,268, Jun. 1, 1990, abandoned.

[30] Foreign Application Priority Data

Jun. 2, 1989 [JP] Japan .................... 1-64812

[51] Int. Cl.⁵ .............................. F16C 1/10
[52] U.S. Cl. .................... 74/502.6; 74/502.4; 74/500.5; 74/501.5 R
[58] Field of Search .......... 74/501.5 R–502.6

[56] References Cited

U.S. PATENT DOCUMENTS

| | | | |
|---|---|---|---|
| 4,823,752 | 4/1989 | Uuskallio | 74/502.4 X |
| 4,823,918 | 4/1989 | Yoshigai | 74/502.4 X |
| 4,833,937 | 5/1989 | Nagano | 74/502.6 X |
| 4,840,605 | 6/1989 | Testa | 74/502.4 |
| 4,854,186 | 8/1989 | Jakob et al. | 74/501.5 R |
| 4,860,609 | 8/1989 | Spease | 74/502.4 |
| 4,895,041 | 1/1990 | Cunningham | 74/502.4 |

*Primary Examiner*—Vinh T. Luong
*Attorney, Agent, or Firm*—Morrison & Foerster

[57] ABSTRACT

The configuration, structure and materials of the components of a control device as well as a control device assembly are disclosed. The control device includes an elongated strip portion which is bent into a J-shaped configuration so that an opening in the J forms a receiving slot for receiving and securely holding a tubular member which encloses a portion of a cable. The receiving slot is slightly smaller in width than the diameter of the tubular member and the slot is bendably expandable while the tubular member is compressible. When the tubular member is in the slot the biasing forces (inward from the control member and outward from the tube) hold the tube in place and allow the tube and cable to be easily and conveniently placed in the control device. The tubular member may include a flange at one end which faces toward the main part of the cable. The other end of the tubular member abuts an expanded abutment on a cable which forms the cable end. The control member can be forced against the cable end to move and precisely position the cable. Due to the configuration of the J-shaped control member and the tubular member the control member can be easily positioned on the tubular member in a simple movement which can be carried out with one hand.

8 Claims, 4 Drawing Sheets

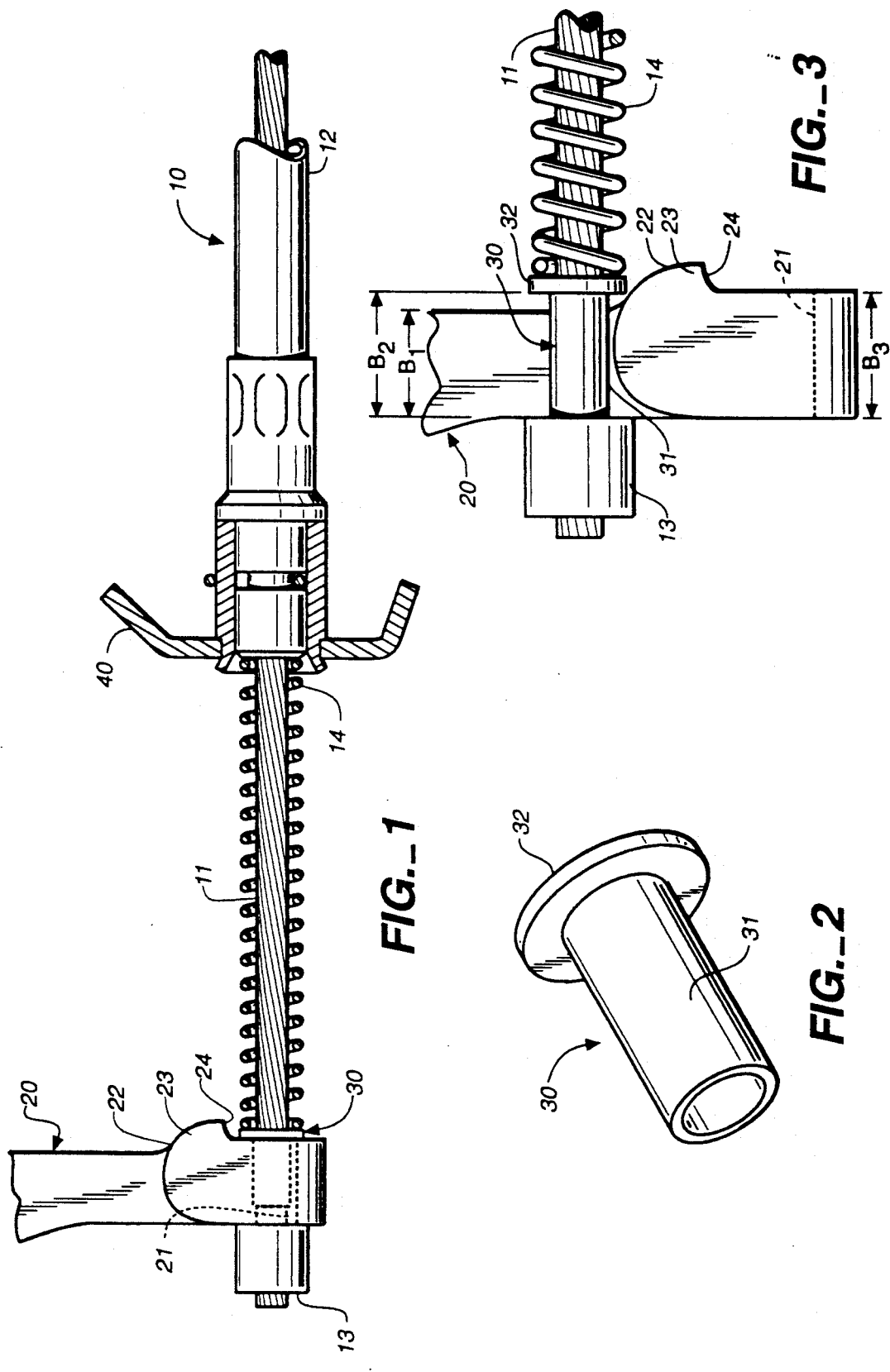

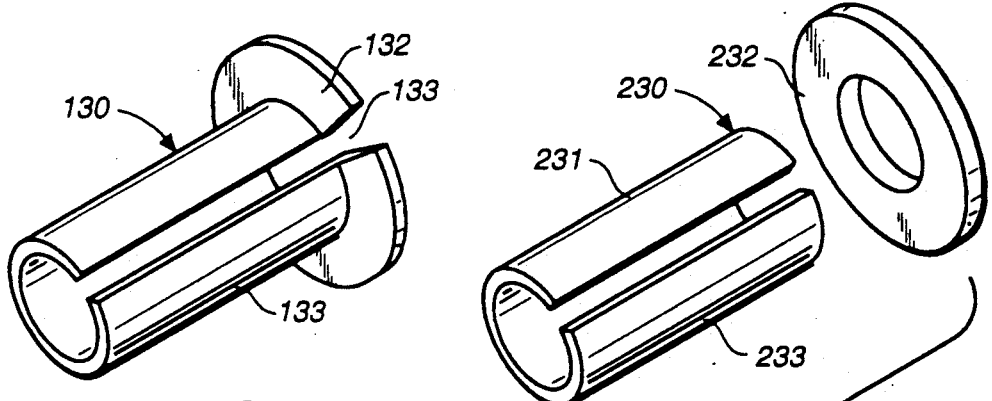
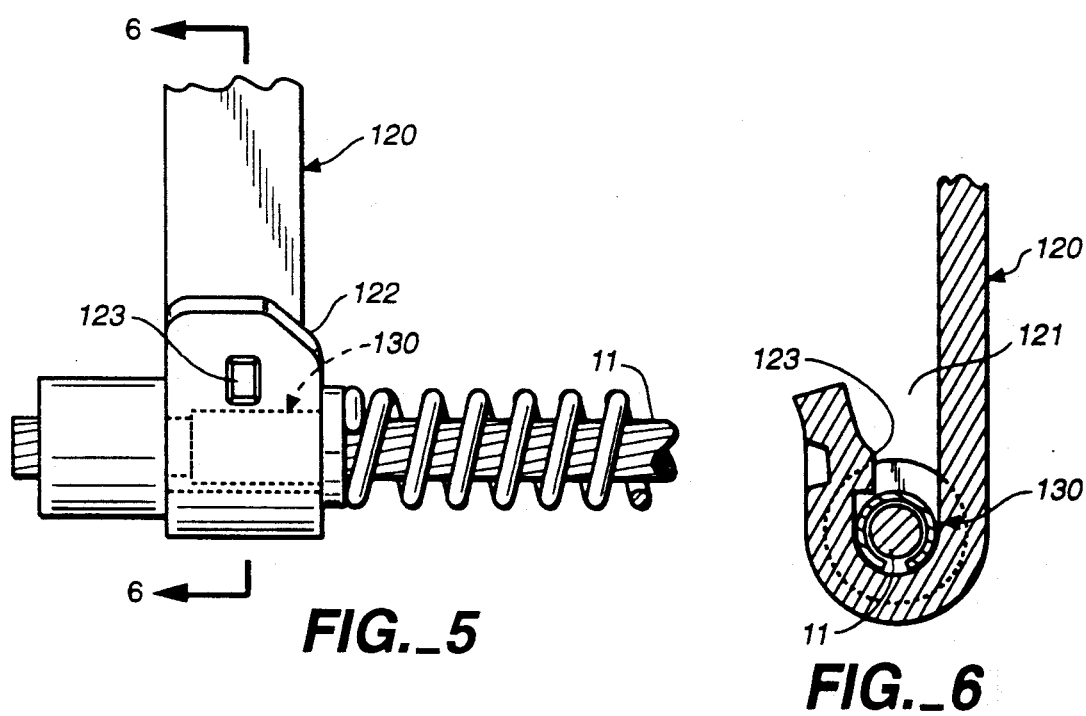

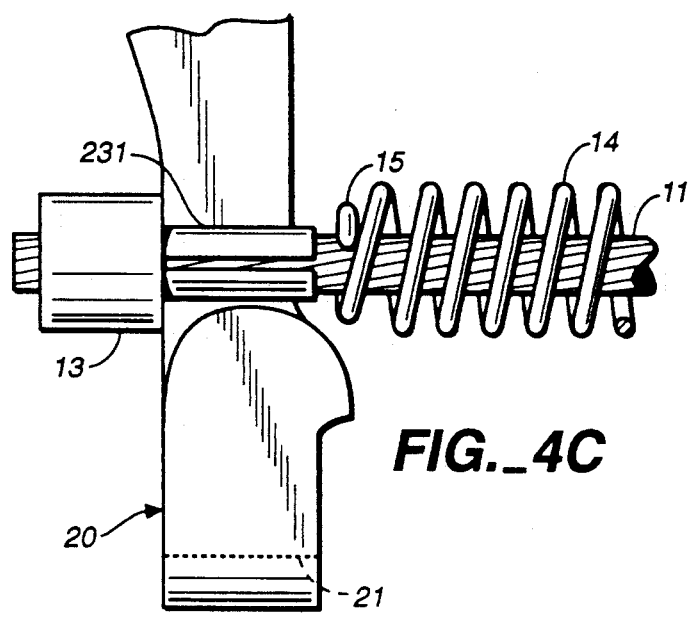
FIG._4C
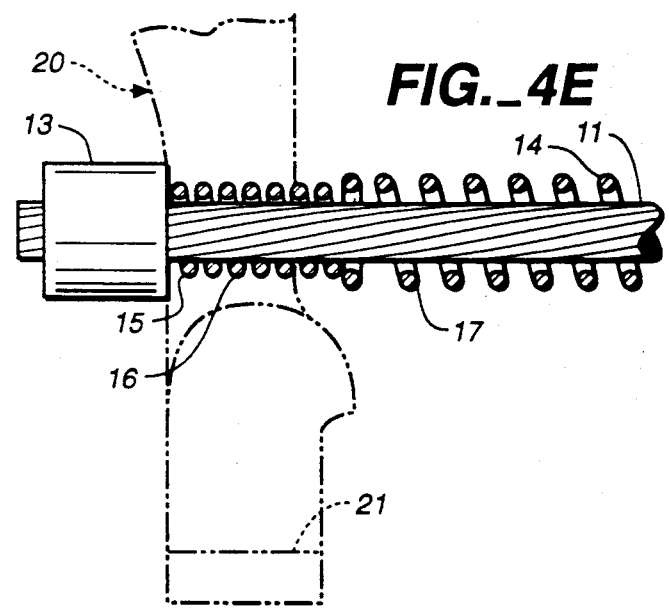
FIG._4E
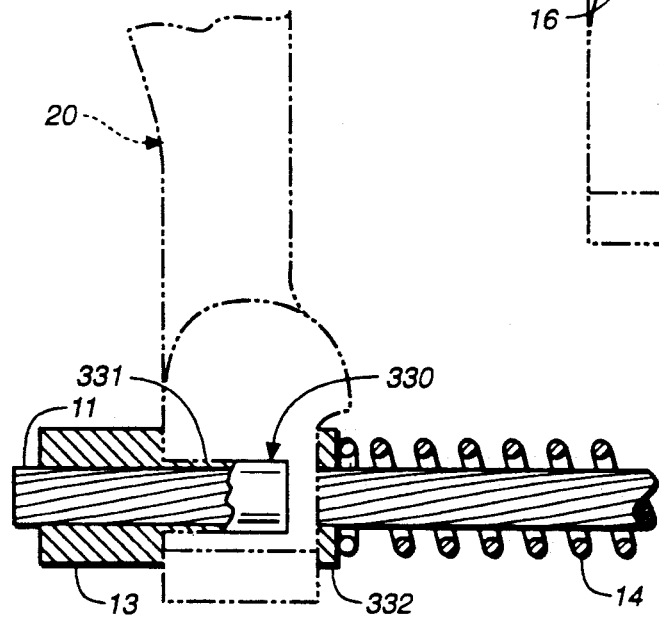
FIG._4D

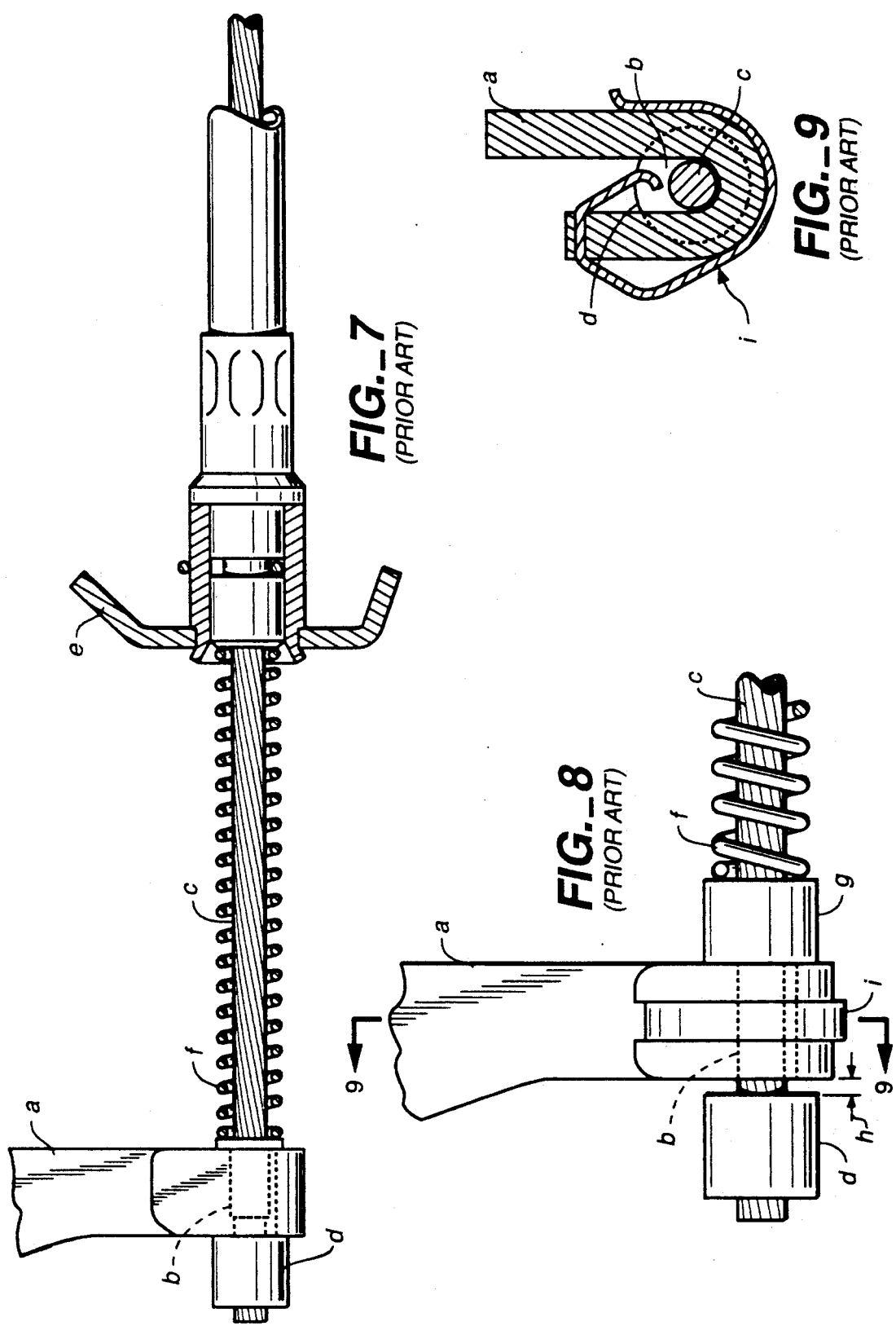

DEVICE FOR CONTROLLING THE POSITION AND MOVEMENT OF A CABLE

This application is a continuation of application Ser. No. 07/532,268 filed, Jun. 1, 1990 abandoned.

CROSS REFERENCES

This application is based on Japanese Patent Application No. 1-64812 filed in Japan on Jun. 2, 1989 to which application is claimed priority under 35 USC § 119.

FIELD OF THE INVENTION

This invention relates generally to the field of cable movement and positioning and more specifically relates to a device capable of precisely moving and positioning a cable from a remote position by means of control member.

BACKGROUND OF THE INVENTION

A complete assembly for moving and positioning a cable is shown within FIG. 7. The assembly is comprised of a control member a, the important portion of which is shown with the remainder extending to a position where the movement of the cable can be remotely controlled. The portion of the control member shown is comprised of a planer band of material which includes a downwardly pointing planer portion and an upwardly curled portion thus forming a J-shaped member and providing a receiving slot b. The J-shaped control member a is positioned between an abutment d which forms the end of the cable and a coiled return spring f which encircles the cable c and extends to the locking or fixing member e.

As can be seen within FIG. 7, the cable c fits within the receiving slot d and movement of the control member a against the abutment d can move the cable c in a leftward direction. Another embodiment of this device is shown within FIGS. 8 and 9. As seen within FIG. 8, a stopper g which is similar in size and shape to the cable end abutment d is positioned between the control member a and the return spring f. The stopper g facilitates the one-handed insertion of the cable c into the receiving slot b by providing the additional space h which space is in excess of that needed for the entire width of the control member a to fit between the stopper g and the cable end abutment d.

A cross-sectional view of the control member shown in FIG. 8 is shown within FIG. 9. In FIG. 9, a bell-shape clip member i can be clearly seen. This clip member is positioned around the J-shaped control member a. The clip i includes one end which extends into the receiving slot b. The clip i is flexible so that the cable c may be forced against the clip i at the opening of the receiving slot b and then forced past the end of the clip i into the bottom of the receiving slot b after which the clip i flexes back into position. Accordingly, the clip i holds the cable c within the receiving slot b preventing the cable from moving out of the slot during cable movement.

Devices such as those shown within FIGS. 7, 8 and 9 do not hold the cable c securely against the sides of the receiving slot b. Accordingly, the cable moves excessively causing excessive wear on the cable and eventual breakage of the cable. Further, due to the manner in which the cable c is positioned within the control member a the cable end abutment d acts as a fulcrum when the control member is used to move the cable which provides excessive pressure at the point between the cable end d and the adjoining cable portion c thus making breakage likely. Further, due to the configuration and structure of the components, it is somewhat difficult to insert the cable into the receiving slot b with one hand, a procedure which is desireable in connection with the use of such assemblies. Although the insertion of the cable into the receiving slot b is somewhat facilitated by the structure shown within FIGS. 8 and 9 these configurations do not securely hold the cable against the sides of the receiving slot so that wear and tear on the cable is inevitable. Further, the need for the space h provides for some inherent inaccuracies in the movement of the cable in that the control member can be moved a small distance without any effect on the cable movement. In addition, it should be pointed out that the bell-shaped clip i may be difficult to position correctly on the J-shaped control member a. Further, it is somewhat difficult to product such clips i having the exact requirements with respect to size, shape and flexibility.

In view of the various disadvantages of the devices as shown within FIGS. 7, 8 and 9, there is clearly a need for control member which can be readily manufactured and used to move and position cable and which overcomes the disadvantages of the above-described devices.

SUMMARY OF THE INVENTION

A cable control device and its operation in connection with a cable control assembly device are disclosed. The materials, configuration and structure of the components of the control device are described in detail. The control device includes an elongated strip portion which is bent into a J-shaped member so as to provide an opening which forms a receiving slot for receiving and securely holding a tubular member which encloses a portion of a cable. The receiving slot is slightly smaller in width than the diameter of the tubular member and the slot is bendably expandable while the tubular member is elastically compressible. When the tubular member is in the slot, the biasing forces (inwardly from the control member and outwardly from the tube) hold the tube in place and allow the tube and cable to be easily and conveniently positioned in the control device. The tubular member may include a flange at one end which faces toward the main portion of the cable. The other end of the tubular member abuts an expanded abutment on the cable which forms the cable end. The control member can be forced against the cable end so as to move and precisely position the cable.

The control member which is the essence of the present invention is generally operated in connection with an entire control assembly which includes (1) the control member; (2) a cable; (3) a cable locking member device; and (4) a return spring positioned around the cable between the control member and the locking device. The precise structure and operation of the locking device will be known to those skilled in the art and is not part of the present disclosure nor are the details of the operation of the entire control assembly. The present invention is directed to the control member, its structure, configuration, operation and composition An object of the present invention is to provide an improved control member capable of precisely moving and positioning a cable.

An advantage of the present invention is that the use of the control member improves the durability of the cable which the control member is used in connection with.

Another advantage of the present invention is that it makes possible more precise and accurate movement of the cable due to the elimination of any wasted or dead space between the control member and the cable end abutment.

A feature of the present invention is that it includes a tubular member which fits securely within a receiving slot of the control member so as to securely hold the cable and restrict movement between the tubular member, the cable and the inward surfaces of the control member.

Yet another advantage of the present invention is that the control member can be easily attached to the cable using only one hand and this operation can be carried out in a safe and efficient manner.

These and other objects, advantages and features of the present invention will become apparent to those skilled in the art upon reading the present disclosure and viewing the accompanying drawings which form a part hereof.

BRIEF DESCRIPTION OF THE DRAWINGS

FIG. 1 is a view of an entire control device assembly including a control member of the present invention;

FIG. 2 is a perspective view of a particular embodiment of a tubular member used within the control member of the present invention;

FIG. 3 is a view of the control member of the invention being positioned on the tubular member which is positioned on a cable;

FIG. 4A a perspective view of a split cylinder embodiment of the tubular member of the invention;

FIG. 4B is a perspective view of split cylinder embodiment of the tubular member of the invention with the flange member being a separate component;

FIG. 4C is a view of the split cylinder tubular embodiment positioned on the cable;

FIG. 4D is a view of a tubular embodiment wherein the tubular member is integral with the cable end abutment;

FIG. 4E is a view of an embodiment of the invention wherein the tubular member is comprised of a tightly wound coil;

FIG. 5 is a view of the control member of the invention showing a movement limiting protrusion on the upwardly curled of the J-shaped control member;

FIG. 6 is a cross-sectional view of FIG. 5 taken along the lines VI—VI;

FIG. 7 is a view of an earlier cable control movement assembly;

FIG. 8 is a view of another embodiment of a cable control member of FIG. 7 positioned on a cable; and FIG. 9 is a cross-sectional view of FIG. 8 taking along the lines IX—IX.

DETAILED DESCRIPTION OF THE PREFERRED EMBODIMENTS

Before the present device for controlling the position and movement of a cable and a process for using such is described, it is to be understood that this invention is not limited to the particular components and configurations specifically shown in the drawings and described herein as such components and configurations may, of course, vary. It is also to be understood that the terminology used herein is used for describing particular embodiments only, and is not intended to be limiting since the scope of the present invention will be limited only by the appended claims.

Referring to FIG. 1, a view of the entire cable control assembly device can be seen. Moving from left to right, the first component within the assembly is the cable end or abutment 13 which is a separate component from the cable 11 or an expanded portion of the cable 11 which provides some type of abutment end means for the cable 11. The end 11 provides a support surface for the application of pressure. Positioned against the abutment or end 13 is the control member 20. The entire portion of the control member 20 is not shown in that only the J-shaped portion shown within FIG. 1 is relevant with respect to the present invention. Suffice to say that the control member 20 can extend outwardly to provide a remote position from which the cable can be moved and positioned. The control member 20 includes a portion which is comprised of a band-like member having planer surfaces which includes a downwardly positioned portion and an upwardly curled portion, thus forming the J-shaped control member 20. The upper end of the J-shaped control member 20 includes a guide surface 22. The guide surface 22 is preferably in the form of a curved surface such as a semicircular surface which may, and preferably does, include a protrusion 23 which extends outwardly from the smooth surface of the band-like control member 20. The protrusion 23 preferably ends abruptly providing a limiting surface 24 which is positioned and extends outwardly in a manner somewhat parallel to the cable 11. The function and operation of the guide surface 22, protrusion 23 and limiting surface will be described in detail below in reference to FIG. 3.

The control member 20 is, as indicated above, in a J-shaped formation, thus providing a receiving slot The receiving slot 21 securely positions and holds a tubular member 30 which tubular member encompasses a portion of the cable 11. One end of the tubular member may include a flange which flange is positioned against and abuts a return spring 14 which encompasses a portion of the cable 11. The return spring 14 extends outwardly from the flange to a locking member 40 which is connected to a cable assembly body 10 and a casing 12 all of which encompass the cable 11. The precise construction and configuration of the components of the locking member 40, cable assembly body 10 and casing 12 are well known to those skilled in the art and accordingly need not be described in detail herein.

Each of the components shown within FIG. 1 can be comprised of a number of suitable materials including metals such as stainless steel and various alloys which are generally used in connection with such devices. Depending on the particular size and composition of the cable, different metals and/or alloys may be more suitable than others. Further, some of the components such as the control member 20 and more particularly the tubular member 30 may be comprised of relatively rigid resinous materials. In certain embodiments of the tubular member described below, it is desirable for the tubular member to have a certain degree of flexibility and resiliency. Accordingly, various types of resin materials which possess a high degree of structural integrity and yet provide some flexibility and material memory are useful and preferred in certain embodiments of this invention.

Referring now to FIG. 2, a perspective view of a first embodiment of the tubular member 30 of the present invention can be seen. In this embodiment of the tubular member, the tube 31 is comprised of a closed cylinder having smooth inner and outer surfaces and is connected to or integral with a flange 32 which is in the form of a disk-shaped member which extends radially outward from one end of the tube 31. By referring back to FIG. 1, it can be seen how the tubular member 30 is positioned within the receiving slot 21 of the control member 20.

Referring now to FIG. 3, a description of how the control member 20 is provided onto the tubular member 30 can be provided. First, the cable 11 is provided with the end or abutment 13. The tubular member 30 is positioned on a portion of the cable immediately adjacent to the end 13 so that the end of the tube 31 abuts and is forced into the end 13 by means of the return spring 14. The flange 32 has an outwardly facing surface which provides a support surface for the return spring 14 thus keeping the spring 14 securely in place.

In the position as shown within FIG. 3, it can be seen that the width of a portion of the control member band $B_1$ is equal to or slightly smaller than the length of the tube $B_2$ which is equal to or slightly smaller than the length of the receiving slot $B_3$ positioned at the bottom of the J-shaped control member 20, i.e., the length of the receiving slot 21 is longer than the tube 31 which is in turn longer than the width of the downward band portion of the control member 20. The size of the components can be represented by the following formula: $B_1 \leqq B_2 \leqq B_3$ as shown in FIG. 3.

In order to position the control member 20 onto to the tubular member 30, the guide surface 22 on the upwardly curled portion of the control member is positioned just below the tubular member 30. By tilting the upper portion of the control member 20 to the left and then back to the right, the guide surface 22 can be moved against the flange 32. The guide surface 22 and the protrusion 23 can be caused to force the flange to the right and compress the return spring 14 slightly so that the space between the flange and the cable end 13 is expanded, i.e., the end of the tube 31 does not abut the end 13. Accordingly, the receiving slot 21 can be fit into place between the cable end 13 and the flange 32. Once positioned, it can be seen that the limiting surface 24 can serve to limit any motion of the flange 32 (see FIG. 1).

Referring now to FIG. 4A, a split cylinder embodiment 130 of the tubular member of the invention can be seen. The member 130 is comprised of a split tube 131 which is connected to or integral with a split flange member 132 both of which are similar in shape to the tubular member shown in FIG. 2 but for the slit 133 which traverses both the tube 131 and the flange 132. The purpose of including the slit 133 is to provide for a degree of compressibility for the tubular member 130. When the slit 133 is included the tubular 130 can be easily provided onto the cable 11 simply by expanding the slit 133 to include the cable 11 and thus position the tubular member 130 in place. However, more importantly, the split cylinder 130 will be in a slightly expanded position while the slit is open. However, once the tubular member 130 is forced within the receiving slot 21, the split cylinder 130 is compressed and the slit is closed. Since the cylinder 130 is comprised of a material with a degree of elasticity, it will continually provide outward forces against the internal surface of the control member 20 within the receiving slot 21. This outward pressure aids in securely positioning the tubular split cylinder 130 within the receiving slot 21. Said differently, the split cylinder 130 is squeezed as it is forced into the receiving slot 21 and remains in the squeezed position within the slot 31 due to the elasticity of the material attempting to reopen the slit 133.

Referring now to FIG. 4B, yet another embodiment of the split cylinder 230 can be seen. Within this embodiment, the cylinder 231 includes a slit 233 which runs the entire length of the tubular member 231. Further, within this embodiment, the flange member 232 does not include a slit and is separate from the tube 231. Although the flange 232 may be connectable or attachable to the tube 231.

Referring now to FIG. 4C, yet another embodiment of the tubular member portion of the invention can be seen. Within this embodiment, the split cylinder tubular member 231 as shown within FIG. 4b is positioned on the cable 11. However, no flange 232 is present. In place of the flange member 232, there is provided and end coil member 15 which abuts the end portion of the split cylinder 231.

Referring now to FIG. 4D, yet another embodiment of the present invention can be seen. Within this embodiment, the tube 331 is closely connected to and/or integral with the end cable abutment 13. Further, within this embodiment, a separate flange member 332 is provided. However, the flange member 332 is optional. This embodiment of the invention demonstrates that the components of the present invention need not be separate components. What is important with respect to the invention is that a portion of the cable abutting and preferably immediately abutting the end 13 be provided with a tubular member, coating or expanded portion of some type which is larger than the cable but smaller than the end abutment 13. This cylindrical member 330 must fit within the receiving slot 21 of the control member 20.

Referring now to FIG. 4E, yet another embodiment of the present invention is shown. In accordance with this embodiment, the tubular member is provided by means of tightly wound coils 16 which wind around the cable 11 until the end coil 15 abuts the cable end 13. The coils 16 may be connected to and/or be integral with the more expanded coils 14 forming the return spring 14. Thus, FIG. 4E provides yet another embodiment of the present invention wherein it can be seen that the tubular member such as the member 30 shown within FIG. 1 need not be a separate member but can be integral with another component of the cable movement device assembly.

Referring now to FIG. 5 a preferred embodiment of the present invention can be further described. This embodiment of the invention refers only to the control member 20 which is now shown as control member 120. The control member 120 includes an upwardly curled portion having a protrusion 123 thereon which extends outwardly from the surface of the control member 120 from the upwardly curled portion towards the downward portion. Further, the upwardly curled portion of the control member 120 includes an arc shaped guide surface which is configured somewhat differently from the guide surface 22 as shown within FIG. 1. Slightly different configurations for the guide surfaces can be provided to provide the best and most efficient and convenient surface for getting the control member onto the tubular member. In this configuration the tubular member is a split cylinder 131 similar to that shown within FIG. 4A. The control member 120 can be moved so that the split cylinder 130 is positioned within the receiving slot of the control member 120 in a manner similar to the manner described with reference to FIG. 3 above.

Referring now to FIG. 6 a cross-sectional view of FIG. 5 along the lines VI—VI can be seen. In the view shown within FIG. 6 the shape of the protrusion 123 can be more clearly seen as can its function be more clearly realized. More specifically, the protrusion 123 extends outwardly from the surface of the upwardly curled portion of the J-shaped control member 120 in a manner so that it protrudes toward the inner surface of the downward portion of the control member 120. In this manner, the protrusion 123 provides a reduced space for the receiving slot 121. This reduced space makes it more difficult for the split cylinder 130 to move into or out of the receiving slot. Accordingly, the split cylinder 131 must be compressed so that it can fit securely within the bottom portion of the receiving slot 120. Once the compressed split cylinder 130 passes the protrusion 123 it will re-expand to a certain degree thus making it difficult for the split cylinder 130 to move out of the receiving slot 121. Since the split cylinder 130 may not expand completely it is held tightly and securely within the bottom portion of the receiving slot 121.

Although the modified embodiment of the control member 120 has been shown as used in connection with a split cylinder 130 it should be noted that the embodiment 120 using the protrusion 123 can be used in combination with other embodiments of the tubular member. However, it is most preferably used in combination with the split cylinder embodiment due to the compressibility of the split cylinder embodiment which works particularly well in connection with the reduced space opening provided by the protrusion 123.

While the present invention has been disclosed with reference to specific embodiments hereof, it should be understood by those skilled in the art that various changes may be made and equivalents may be substituted without departing from the true spirit and scope of the invention. In addition, many modifications may be made to adapt a particular situation, material, component, configuration, to the object, spirit and scope of the present invention. All such modifications are intended to be within the scope of the claims appended hereto.

What is claimed is:

1. A cable movement and position control device assembly, comprising:
    a cable having an expanded abutment end portion;
    a cable member locking assembly positioned around the cable and capable of locking the cable into position and restricting the movement of the cable in one or either direction;
    a return spring positioned around the cable and extending from the cable member locking assembly toward the expanded abutment end portion of the cable;
    a tubular portion slidably positioned around the cable and between the return spring and the expanded abutment end portion of the cable the tubular portion having a flange member extending radially outward from an end of the tube, the flange member having an outwardly facing surface which contacts and forces against the return spring thereby maintaining the return spring in place; and
    a control member having a portion in the form of an elongated band bent into a J-shaped configuration so as to provide a receiving slot in which the tubular portion is held, the slot being provided between a downward planar portion of the band and an upwardly curled portion of the band, the receiving slot being equal in width or slightly smaller than the outer diameter of the tubular portion, the upwardly curled portion of the band having a protrusion extending outwardly beyond an edge of the band, the protrusion being positioned and shaped so as to contact and force against an inwardly facing surface of the flange member to thereby limit the movement of the flange member.

2. The cable assembly device as claimed in claim 1, wherein the tubular portion is in the form of a solid tube with a uniformed outer surface and a uniform inner surface.

3. The cable assembly device as claimed in claim 2, wherein the flange includes planar and is formed integral with the solid tube.

4. The cable assembly device as claimed in claim 1, wherein the tubular portion is comprised of tightly coiled wire.

5. The cable assembly device as claimed in claim 4, wherein the tightly coiled wire tubular portion is integral with and an extension of the return spring positioned around the cable with the return spring being a coiled wire which is more loosely coiled than the tightly coiled wire forming the tubular portion.

6. The cable assembly device as claimed in claim 1, wherein the upwardly curled portion of the band includes a curved upper guide surface.

7. The cable assembly device as claimed in claim 1, wherein the tubular portion is in the form of a split tubular portion having an elongated slit along the entire length of the tube and further wherein the tubular portion is comprised of a bendable material with elastic resistance and structural memory.

8. The cable assembly device as claimed in claim 1, wherein the tubular portion is connected to or integral with the expanded abutment end portion of the cable.

* * * * *